US008346640B1

(12) United States Patent
Sanders et al.

(10) Patent No.: US 8,346,640 B1
(45) Date of Patent: Jan. 1, 2013

(54) MULTI-ACCOUNT CASH RECYCLING

(75) Inventors: William Thomas Sanders, Denver, NC (US); Karren D. Grant, Norcross, GA (US); Amy Baker Folk, Charlotte, NC (US); Daniel Christopher Bohen, Charlotte, NC (US); Shane Anthony Johnson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 156 days.

(21) Appl. No.: 12/277,977

(22) Filed: Nov. 25, 2008

Related U.S. Application Data

(63) Continuation-in-part of application No. 12/099,832, filed on Apr. 9, 2008.

(51) Int. Cl.
*G06Q 40/00* (2012.01)

(52) U.S. Cl. ............................. 705/35; 235/376; 705/43

(58) Field of Classification Search .................... 705/43; 235/379
See application file for complete search history.

(56) References Cited

U.S. PATENT DOCUMENTS

| | | | |
|---|---|---|---|
| 6,848,612 B2 | 2/2005 | Uematsu et al. | |
| 6,983,836 B2 | 1/2006 | Adams et al. | |
| 8,047,427 B2 * | 11/2011 | Sanders et al. | 235/379 |
| 2001/0020638 A1 * | 9/2001 | Uematsu et al. | 235/379 |
| 2001/0054643 A1 | 12/2001 | Siemens | |
| 2003/0046234 A1 * | 3/2003 | Takadachi | 705/43 |
| 2003/0083969 A1 | 5/2003 | Uchiyama et al. | |
| 2004/0200690 A1 | 10/2004 | Adams et al. | |
| 2005/0045714 A1 | 3/2005 | Hermanussen | |
| 2005/0080731 A1 | 4/2005 | Snyaneshwar | |
| 2005/0108164 A1 | 5/2005 | Salafia et al. | |
| 2005/0131824 A1 * | 6/2005 | Drummond et al. | 705/43 |
| 2006/0022032 A1 | 2/2006 | Fillinger et al. | |
| 2007/0045395 A1 | 3/2007 | Corona et al. | |
| 2007/0063016 A1 | 3/2007 | Myatt et al. | |
| 2007/0100750 A1 * | 5/2007 | Hartfield et al. | 705/43 |
| 2008/0296366 A1 * | 12/2008 | Schoeffler et al. | 235/379 |
| 2009/0018959 A1 | 1/2009 | Doran et al. | |
| 2011/0089231 A1 * | 4/2011 | Artino et al. | 235/379 |

FOREIGN PATENT DOCUMENTS

| | | |
|---|---|---|
| EP | 1486923 | 12/2004 |
| WO | 2005038623 | 4/2005 |

OTHER PUBLICATIONS

International Search Report and Written Opinion for International Application No. PCT/US2007/088650 mailed Sep. 16, 2008, 10 pages.
Final Office Action for U.S. Appl. No. 12/099,832, mailed Sep. 1, 2010.
Non-final office action for U.S. Appl. No. 12/099,832 mailed Dec. 17, 2010.
M2 Presswire, "Diebold: Diebold Installs 250th Bulk Cash Deposit Machine at HSBC UK," Dec. 14, 2006, p. 1.
Valentine, "Self-serve Coin Counters Are All the Rage," Mar. 2007, American Bankers Association, ABA Banking Journal, vol. 99, Issue 3, p. 7.
Final office action for related U.S. Appl. No. 12/099,832 mailed May 13, 2011.

\* cited by examiner

*Primary Examiner* — Samica L Norman
(74) *Attorney, Agent, or Firm* — Banner & Witcoff, Ltd.; Michael A. Springs

(57) ABSTRACT

A currency handling device such as a currency recycler, depository machine or a dispensing machine may provide users with the ability to access multiple accounts from the same device. Accordingly, a user may make deposits to or withdrawals from multiple accounts from a single device. The multiple accounts may, for example, correspond to different departments in a business or organization, allowing employees from different departments to use the same currency device to process transaction (e.g., change orders, deposits, etc.).

18 Claims, 12 Drawing Sheets

Money Recycler

Welcome to DEVICE @ NAME OF BUSINESS/ ORGANIZATION

Please Login

800a

Account or User ID:

801

PIN/Security Code:

FIG. 8A

Money Recycler

Welcome, FIRST NAME, LAST NAME
Employee ID: XXXXX — 810

800b

PLEASE INSERT MONEY $27.00     805

815

CANCEL             COMPLETE

FIG. 8B

MULTI-ACCOUNT CASH RECYCLING

CROSS REFERENCE TO RELATED APPLICATIONS

The present application is a continuation-in-part of U.S. application Ser. No. 12/099,832, entitled "CASH TO CARD RECYCLING," and filed on Apr. 9, 2008, the content of which is incorporated herein by reference in its entirety.

BACKGROUND

Cash flow refers to the movement of cash over a particular time period within a business or enterprise. The calculation of cash flow may be used as one measure to gauge financial health of the business. Managers in charge of cash flow management may use various tools to assist in making decisions involving cash flow including cash recyclers which allow a retail establishment to maintain and re-use an amount of currency on-site. The cash recycler may further calculate and manage use of cash flows in real-time.

While cash recyclers allow a business to manage their cash flows in a more seamless manner, recyclers and other cash handling devices might only provide access to a single financial account (e.g., the account of a retail business). Thus, an organization or business wishing to conduct transactions across multiple accounts may be required to purchase and use multiple recyclers (i.e., one for each account).

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one aspect of the invention, an end-to-end currency handling and servicing apparatus is provided to any cash-centric business or enterprise. In various embodiments, the method, apparatus, and system may provide cash register till set up and balancing, back office reconciliation, and other cash payment handling activities. Currency recycling systems may be placed in a business location in, e.g., a back office area and may be networked with one or more systems in the business or with remote computers such as a banking system. Additionally or alternatively, a cash recycling apparatus may be configured to receive currency deposits and recycle the deposited currency for withdrawals. In one embodiment, the cash recycling apparatus may scan each deposit for bills that have been illegitimately reproduced.

According to another aspect, a cash handling device such as a currency recycler may be linked or provide access to multiple financial accounts. Thus, users of the cash handling device may conduct transactions across multiple accounts, rather than a single account. The multiple accounts may each correspond to a different purpose, a different department, subdivisions of a company and the like. The funds in the recycler may be reconciled on an account-by-account basis.

BRIEF DESCRIPTION OF THE DRAWINGS

The present disclosure is illustrated by way of example and not limited in the accompanying figures in which like reference numerals indicate similar elements.

FIGS. 8A-D illustrate sample user interfaces through which a user may insert and deposit funds to one or more accounts according to one or more aspects described herein.

DETAILED DESCRIPTION

In accordance with various aspects of the disclosure, systems and methods are illustrated for providing currency handling services and management. A financial institution such as a bank may provide immediate access and use of funds recently deposited using the currency handling apparatus, system, and method described below. For illustrative purposes the financial instrument discussed throughout the below description is cash. However, as those skilled in the art will realize, the described aspects of the invention are not limited to just cash (paper money and coins) and but may also include other forms of liquid assets such as checks, bank notes, and money orders.

Figure 1:
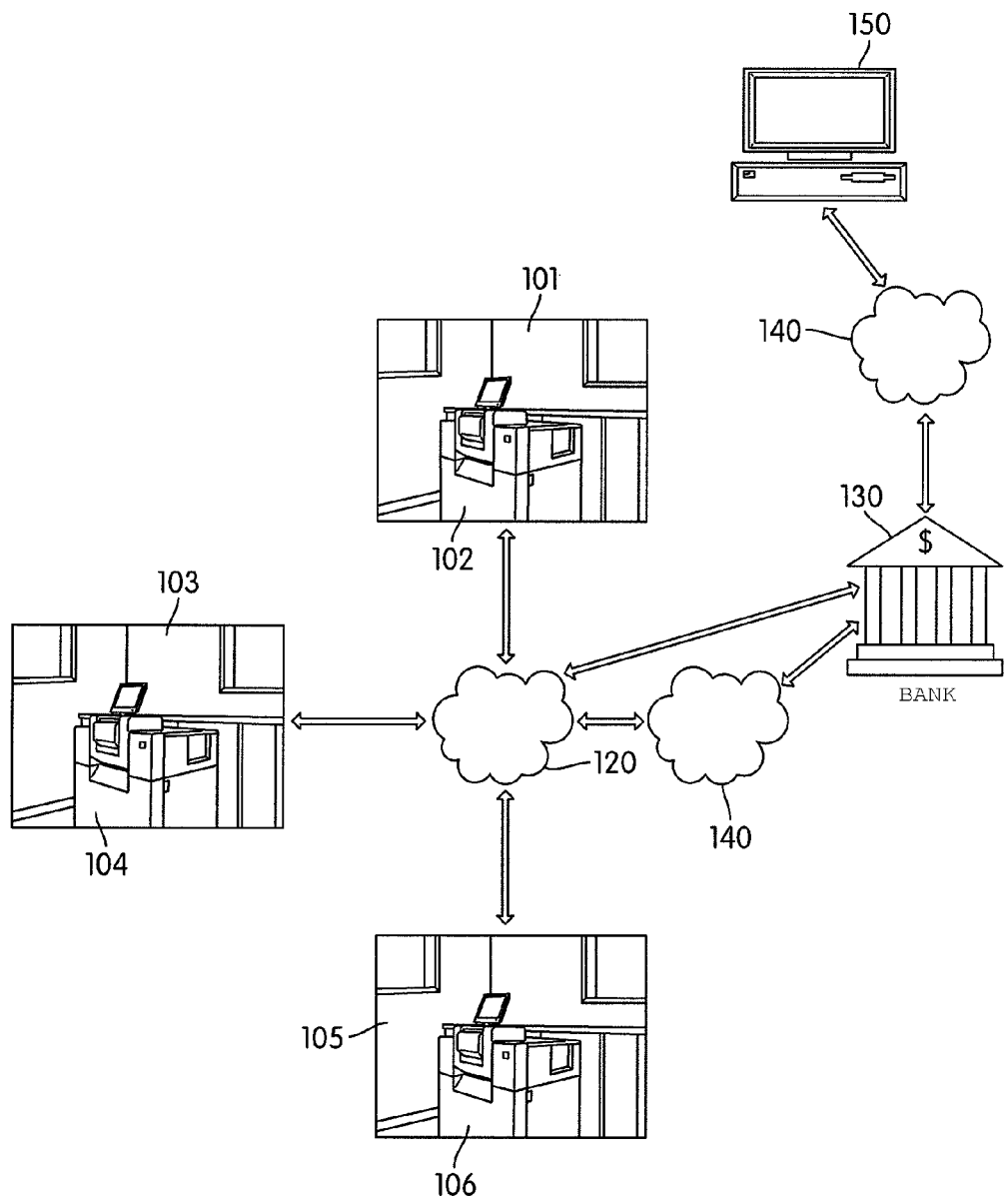
FIG. 1 illustrates an example of a suitable operating environment in which various aspects of the disclosure may be implemented.

FIG. 1 illustrates an example of a suitable operating environment in which various aspects of the disclosure may be implemented. Currency or cash recyclers 102, 104, 106 may be located at various locations such as locations 101, 103, and 105. The locations may represent different stores of a business enterprise. For example, locations 101, 103, and 105 may represent three different grocery stores located in different geographical areas belonging to a grocery chain. Those skilled in the art will realize that additional cash recyclers may be located in same stores or in other stores belonging to the grocery chain. In addition, those skilled in the art will realize that a grocery chain is only one illustrative example of the types of locations that cash recyclers may be located. For example, cash recyclers may also be located in gas stations, post offices, department stores, restaurants and other places where cash and other financial instruments are deposited or withdrawn.

FIG. 1 further illustrates that cash recyclers 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash recyclers 102, 104, and 106 may communicate with one another or with a financial institution such as bank 130 via communication network 120 in ways that are well known in the art. The existence of any of various well-known protocols, such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like may be used as the communications protocol. Communications network 120 may be directly connected to a financial institution such as bank 130. In another embodiment, communications network 120 may be connected to a second network or series of networks 140 before being connected to bank 130.

Figure 2:
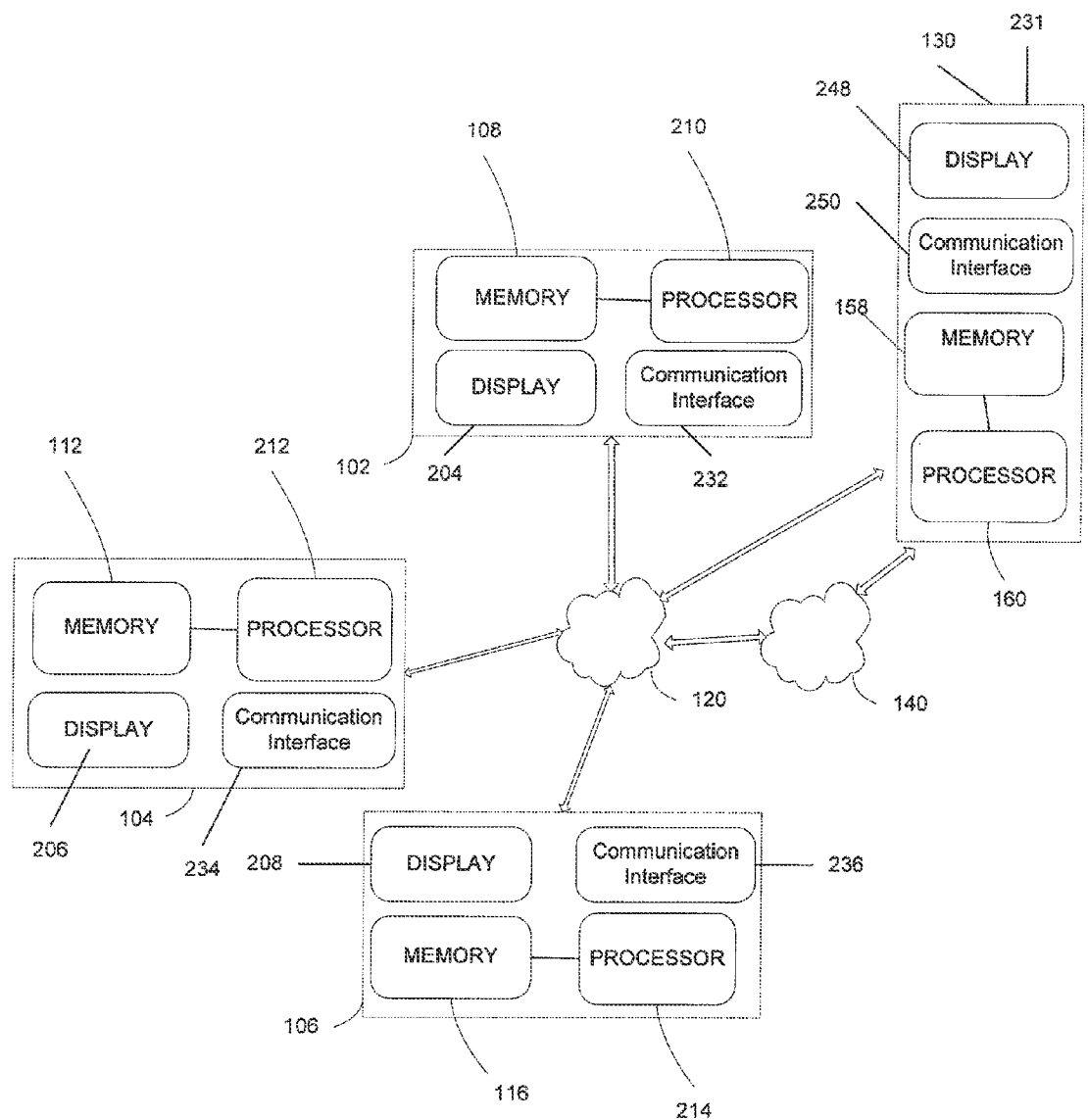
FIG. 2 illustrates a simplified diagram of a currency recycler in accordance with an aspect of the invention.

FIG. 2 illustrates a simplified diagram of a cash recycler in accordance with an aspect of the invention. Cash recyclers may comprise memories (108, 112, and 116) processors (210, 212, and 214), displays (204, 206, and 208), and communication interfaces (232, 234, and 236). The processors 210, 212, and 214 may execute computer-executable instructions present in memory 108, 112, 116 such that, for example, the cash recyclers 102, 104, and 106 may send and receive information to and from bank 130 via network or networks 120 and/or 140. Bank 130 may utilize an infrastructure which includes a server 231 having components such as memory 158, processor 160, display 248, and communication interface 250. The memory for each of the cash recyclers 102, 104, and 106 and server 231 may include non-volatile and/or volatile memory.

Figure 3:
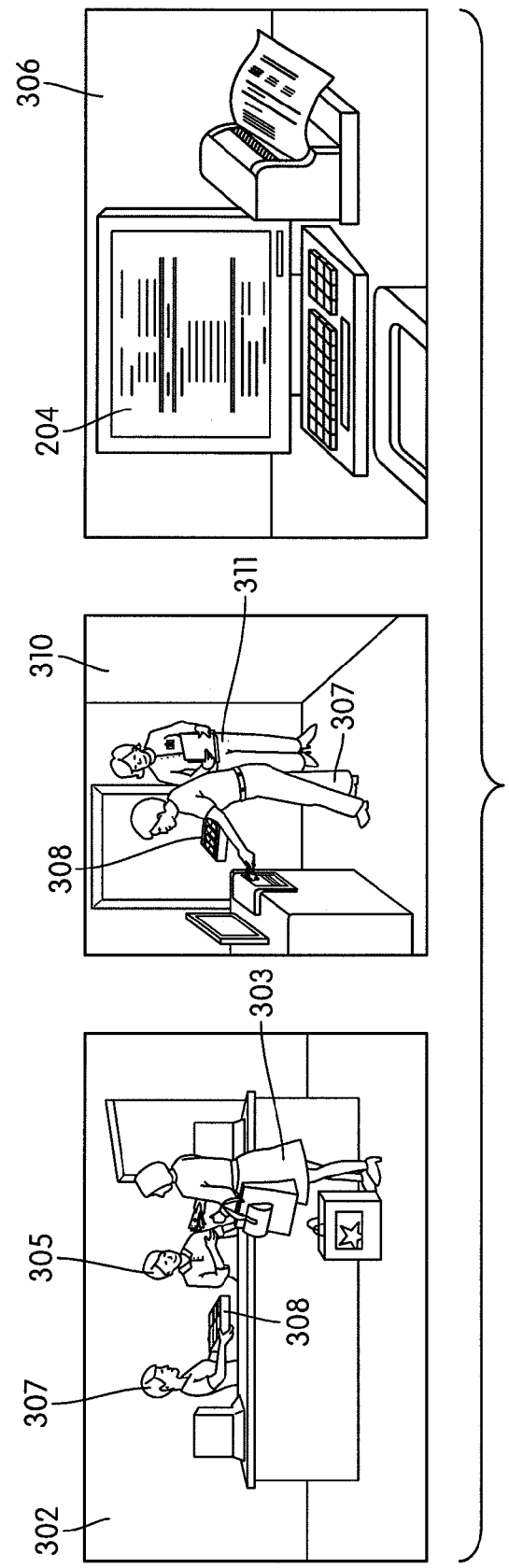
FIG. 3 illustrates various features of a currency recycler that may be used in accordance with aspects of the invention.

FIG. 3 illustrates various features of cash recycler 102 used in various aspects of the invention. The images in FIG. 3 depict use of a single cash recycler 102 in a retail environment. The retail owner may have a cash recycler 102 located in each of their stores. In an aspect of the invention, summary information for the retail owner's stores may be available via an interface to the financial institution. In another embodiment, access to summary information may be available directly from each of the cash recyclers 102.

In FIG. 3, image 302 depicts customer 303 paying cash to store cashier 305 for a purchase. Another store cashier 307 at a recently closed cash register may be carrying a cash drawer or till 308 to a back office for reconciliation. In image 310, store cashier 307 may load currency from cash register till 308 into cash recycler 102. In addition, store cashier 107 may also deposit other paper forms of payment received from customer such as checks. An office manager 311 may be supervising cashier 307 during the loading of cash register till 308 into cash recycler 102. Moreover, upon the start of a shift a cashier may fill his/her cash register till with a designated amount of currency dispensed from cash recycler 102.

In image 306 of FIG. 3, a display screen 204 of cash recycler 102 may show the total amount entered into cash recycler 102 from till 308. The display screen 204 may breakout the amount entered into cash recycler 102 by denomination and by each cashier. The total amount deposited and withdrawn from cash recycler 102 may be shown on display screen 204. Currency recyclers and recycling management are further described in U.S. application Ser. No. 11/614,656, entitled "Commercial Currency Handling and Servicing Management," filed on Dec. 21, 2006, the content of which is incorporated herein by reference in its entirety.

Figure 4:
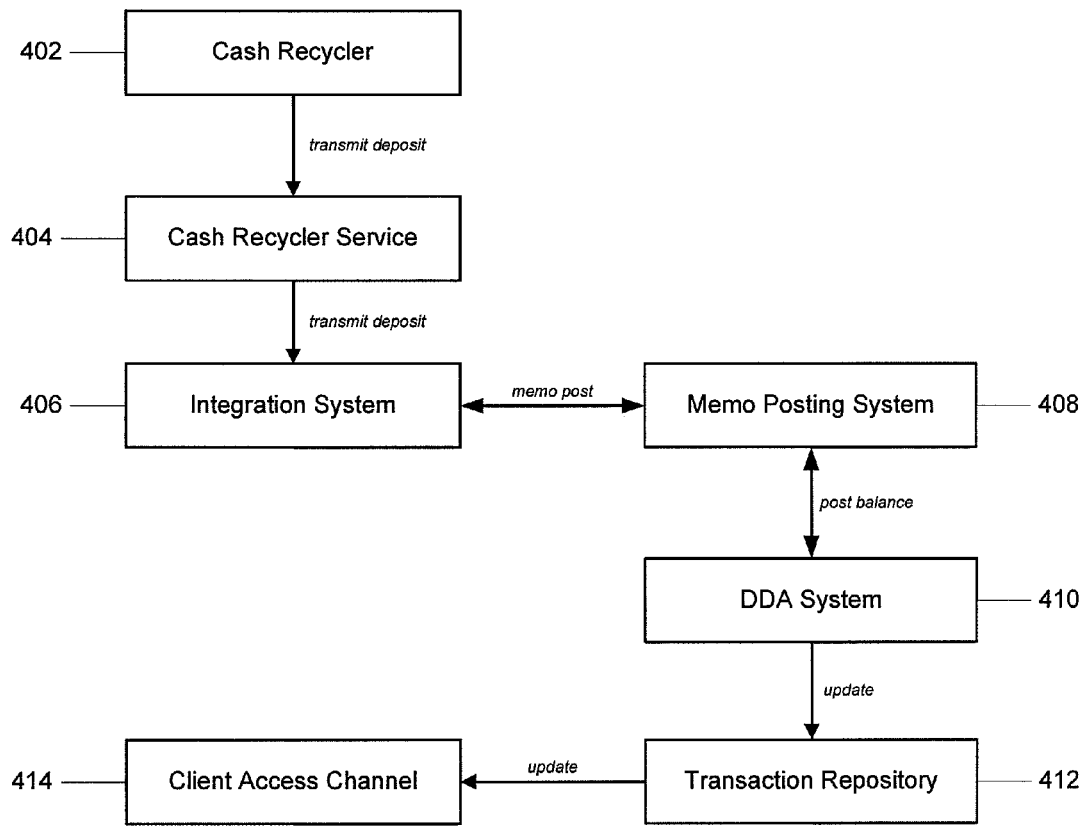
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers many advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, and U.S. application Ser. No. 12/241,385, entitled "Immediate Recognition of Financial Transactions," and filed on Sep. 30, 2008, the content of each being incorporated herein by reference in its entirety.

Figure 5:
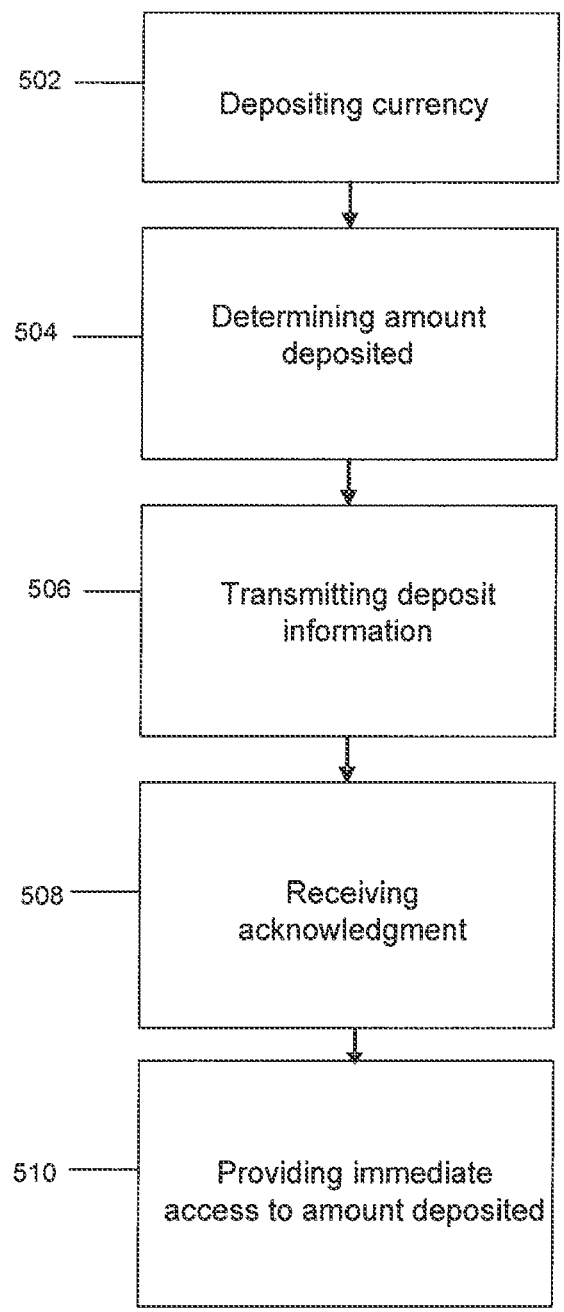
FIG. 5 illustrates a method of providing immediate availability to amount deposited in accordance with an aspect of the invention.

FIG. 5 illustrates a method of providing immediate access to an amount deposited in accordance with an aspect of the invention. In step 502, an enterprise employee may deposit a first amount of currency in a cash recycler. The cash recycler may accept different forms of currency including bills, coins, and checks. The cash recycler in step 504 may determine the amount of currency deposited by the enterprise employee. The cash recycler may query the enterprise employee to acknowledge the determined amount of currency to be deposited before proceeding. In step 506, the cash recycler may transmit information relating to the amount of currency deposited to a financial institution. The financial institution upon receipt of the transmitted information may access the account of the enterprise and update the balance by the amount of the deposit. The financial institution may transmit an acknowledgement that the enterprise account has been updated. In step 508, the cash recycler may receive an acknowledgement of the deposit. In step 510, the enterprise may have immediate availability to the amount deposited to the account.

Figure 6:
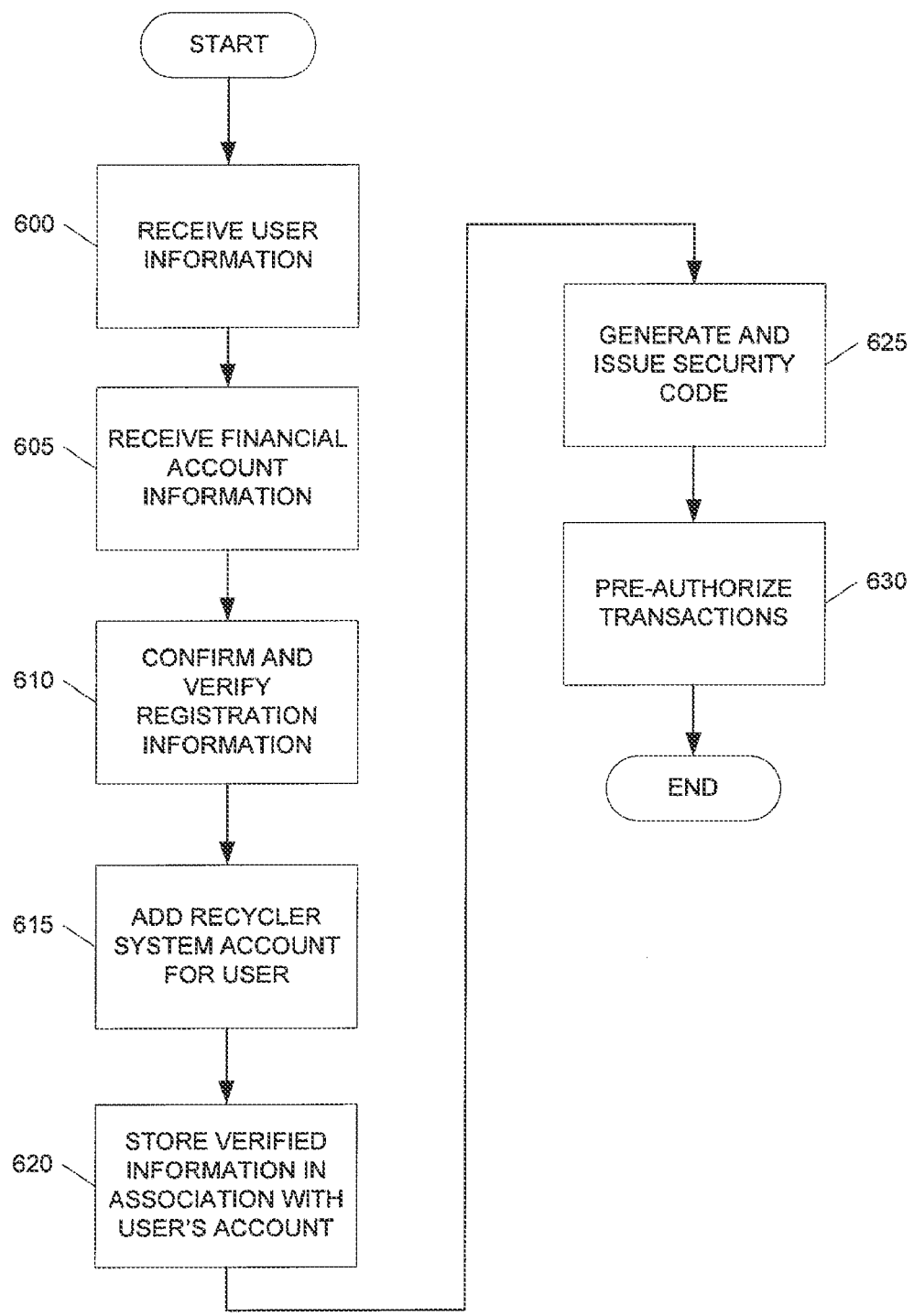
FIG. 6 illustrates a method for registering a user in a recycler system according to one or more aspects described herein.

FIG. 6 illustrates a method for registering a user and one or more accounts with a recycler system. A user and the user's account(s) may need to be registered with the system to insure that only authorized users and authorized accounts are used in conjunction with the recycler system. In addition, transactions with accounts to which funds are to be deposited may be pre-authorized so that deposited funds may be made immediately available to the depositing user. Accordingly, in step 600, a recycler system or recycler servicing system may receive user specific information including personal data such as a name, address, employee number, e-mail address and phone number. In step 605, the recycler or recycler servicing system may receive information identifying financial accounts such as checking, savings, credit card and/or debit card accounts associated with the registering user. In step 610, the recycler system or servicing system may confirm and verify the registration information. For example, the ownership and existence of accounts may be checked by requesting confirmation from the holding financial institution. Additionally, the information associated with the specified accounts may be compared to the personal information entered by the user to insure that the account belongs to the user.

Upon confirming and verifying the registration information, the recycler or recycler servicing system may then add the user to a database of user profiles or accounts in step 615. In addition, verified account information may be stored in association with the user profiles in step 620. In step 625, a security code or personal identification number (PIN) may be generated and issued to the registering user. The code or PIN may be intended only for the registering user's knowledge as a way to verify the user's identity when the user operates the recycling system. According to one or more aspects, a recycler or recycler servicing system may also pre-authorize transactions (e.g., transfers of funds) between the registering user's account and an account of the employer or business in step 630. Pre-authorization may involve establishing a level of trust and security between the two financial institutions and/or the two accounts. Once received, pre-authorization may allow transfers to occur in a shorter amount of time by bypassing more formal funds transfer requirements.

Figure 7:
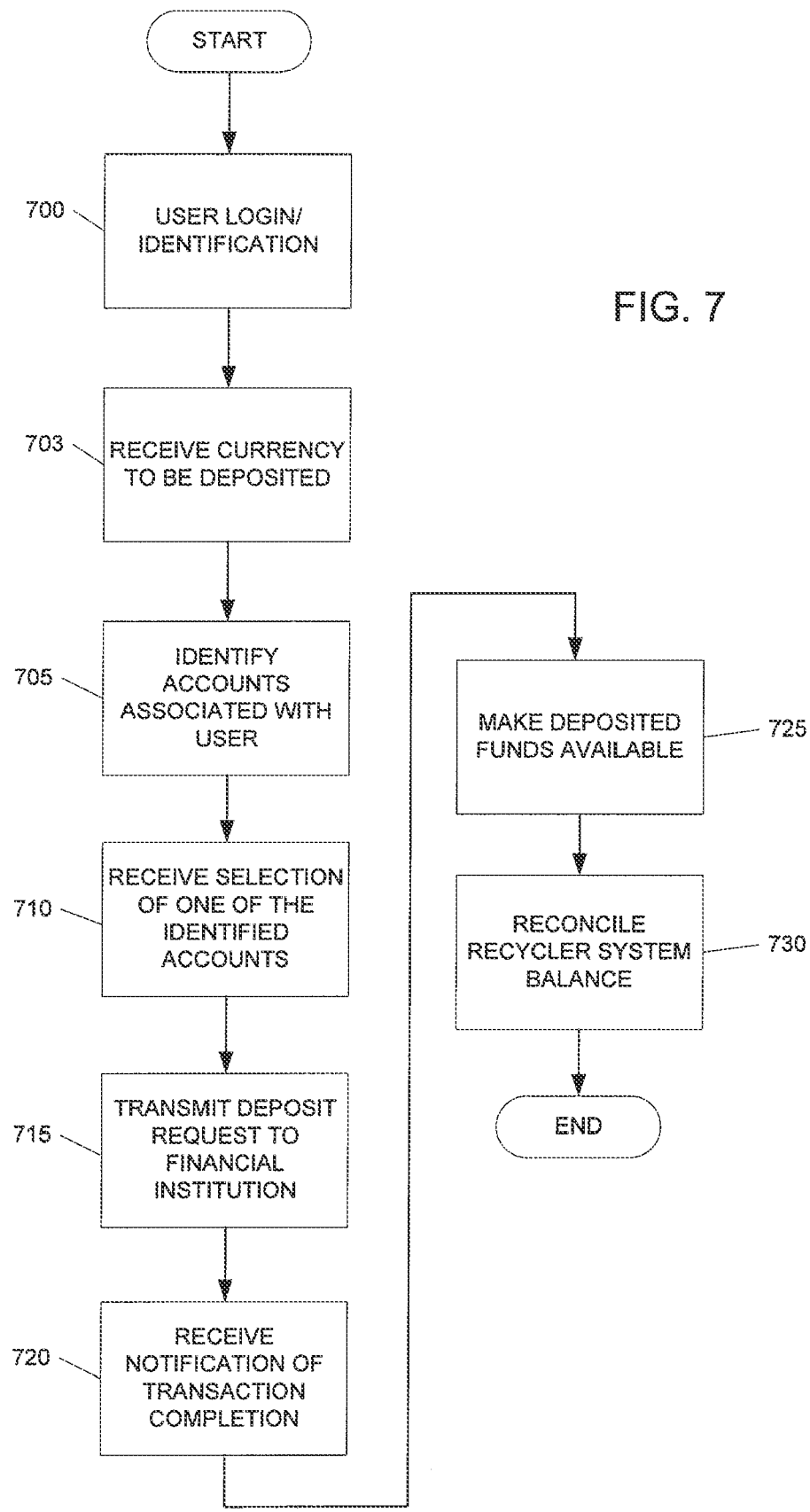
FIG. 7 illustrates a method for receiving currency and depositing the currency in a user account according to one or more aspects described herein.

FIG. 7 illustrates a method for distributing currency from a business's cash recycler to an account of an employee of the business. One scenario in which such a method may be used is when a retail employee wishes to transfer all or some of her tips onto a debit card, pre-paid cash card or mobility device for easier or safer transport. A mobility device or mobile payment device may include a variety of payment mechanisms including mobile phones, personal data assistants (PDAs) and the like. Thus, in step 700, the user may log in or otherwise identify herself to the currency recycler system. Once the user has been identified, the cash recycler system may receive an amount of currency that corresponds to at least the amount the user desires to transfer to his or her debit card, pre-paid card, mobility device or other account in step 703. As discussed, currency inserted into the system may be scanned for value and to identify currency that has been illegitmately reproduced. In step 705, the cash recycler system may identify one or more accounts associated with the user to which the inserted currency may be deposited. Various types of accounts may include a savings account, a checking account, a gift card account, a debit card account, mobility device and the like. Accounts may be linked or otherwise associated with an employee or user using a database as discussed above. As will be discussed in further detail below, in one or more configurations, deposits or payments may be made across multiple accounts in the same transaction.

In step 710, the cash recycler system may receive a selection of an account to which the inserted currency is to be deposited. Optionally, an account may be selected at the end of the transaction to allow splitting of funds among multiple accounts as described herein. Once the deposit account has been selected, the cash recycler system may transmit the deposit request to the business's banking institution to facilitate and complete the transfer of funds in step 715. For example, the recycler system may communicate with a recycling service system (e.g., system 404 of FIG. 4) at the business's banking institution to initiate and complete a funds transfer to the employee's selected account. The receiving account may be pre-registered as an authorized or trusted transfer account (Step 630 of FIG. 6) so that the funds transfer may be completed in a shorter amount of time and/or the transferred funds may be made available more quickly. Once the transfer has been authorized and completed, the recycler system may be notified in step 720. Further, the recycler system may begin allowing the use of the deposited currency in step 725 by making the funds available for withdrawal. On occasion (periodically or aperiodically) the recycler system may also reconcile the system balance with the financial institution's balance in step 730. For example, at the end of each day, the recycler system of a business may upload the balance in the machine to the bank, which then registers that amount (or a portion thereof) as a deposit to the business's account.

In one or more arrangements, a user wishing to deposit funds onto a pre-paid or debit card, or mobility device may select a receiving account by inserting a corresponding card, registering a mobility device, or entering an account number and/or personal identification number (PIN). For example, a user may swipe his or her cell phone near an RFID scanner to identify an account to the recycler system. Thus, the recycler system might not require a priori knowledge of the receiving account prior to the user initiating and making a deposit.

Figure 8C:
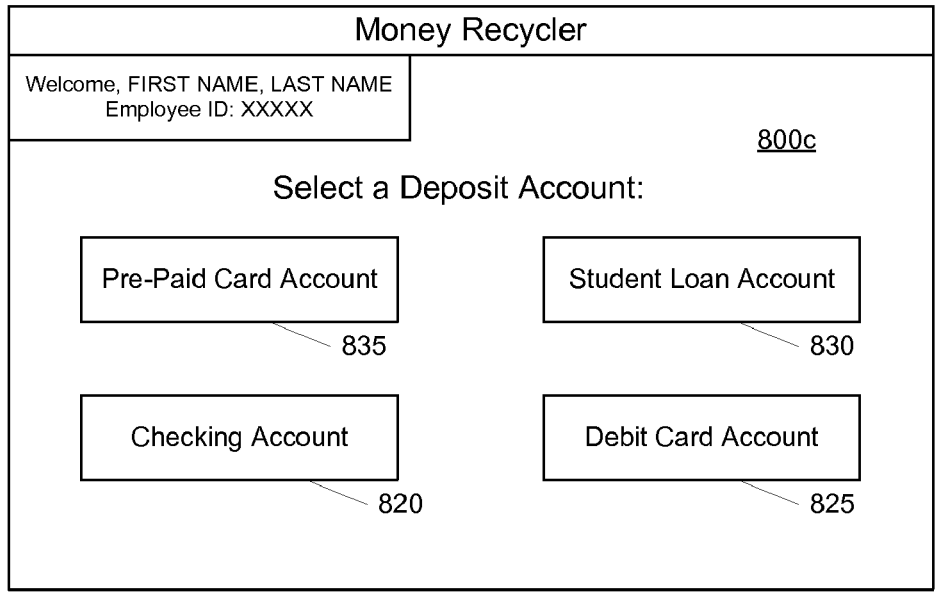
Figure 8D:
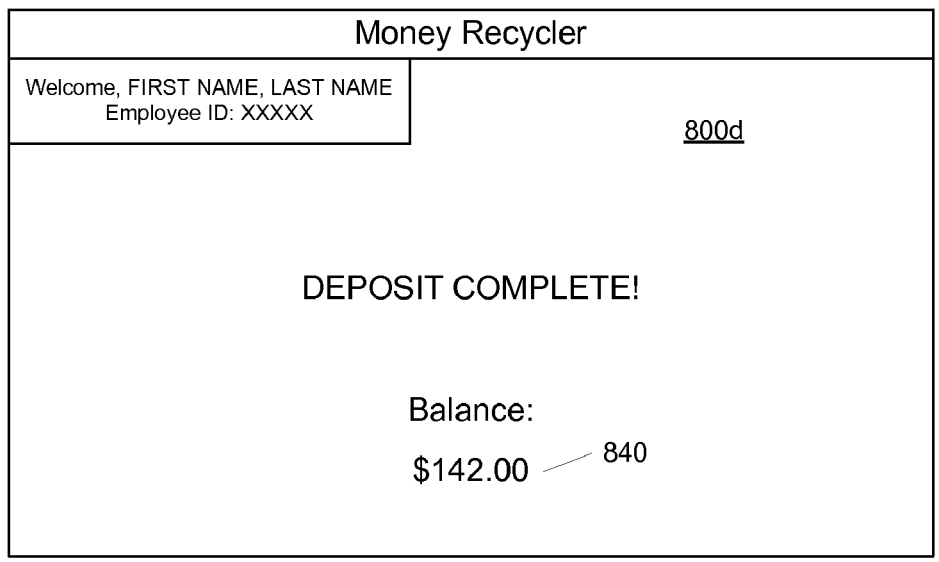

FIGS. 8A-8D illustrate user interfaces through which an employee or another user may make a deposit. In FIG. 8A, interface 800*a* may display a welcome message followed by a request to enter an identification number, e.g., in field 801, or to insert an identification device such as an employee or pre-paid card. An identification number may, for example, correspond to an employee number or may correspond to a bank account associated with the employee. FIG. 8B illustrates an interface 800*b* for requesting insertion of currency upon the user identifying herself by inserting an identification device or entering an identification number through interface 800*a*. Currency counter field 805 may keep track of an amount of money that has been inserted by the user. Identification information such as a name and employee number may also be provided in information box 810. Complete option 815 allows a user to indicate that she has finished inserting currency and is ready to proceed to the next step.

FIG. 8C illustrates an interface for selecting a deposit account for the inserted currency. For example, interface 800*c* may list bank account 820, debit card account 825, student loan payment account 830 and pre-paid account 835. In one or more arrangements, interface 800*c* may further display the balances (not shown) associated with each of accounts 820-835. Once an account has been selected, interface 800*d* of FIG. 8D may be displayed to confirm that the transfer has been completed. Additionally, a new balance for the selected account may also be displayed in balance field 840.

Figure 9:
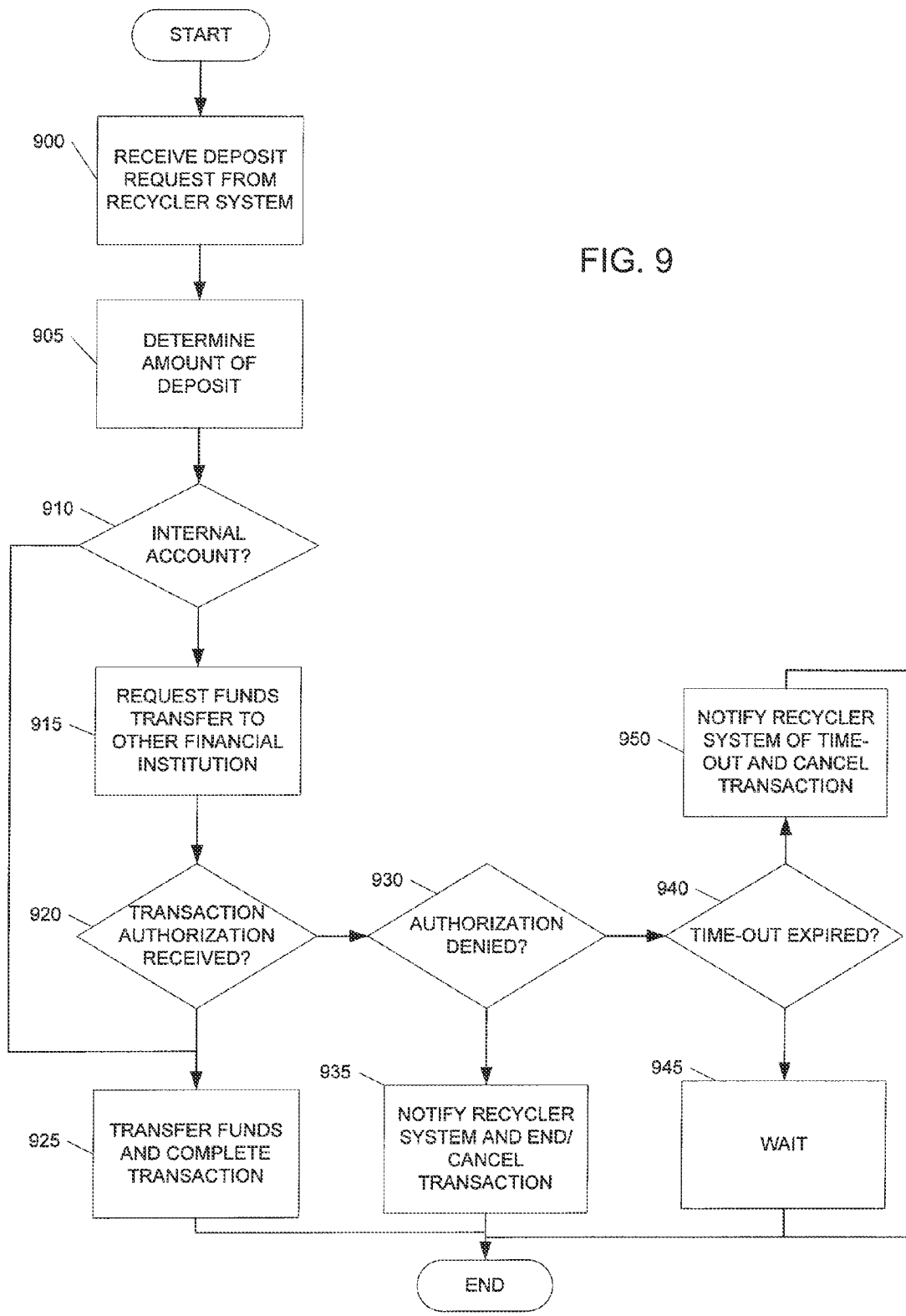
FIG. 9 illustrates a method for processing a deposit request received from a recycler system according to one or more aspects described herein.

FIG. 9 is a flowchart illustrating a method for processing a deposit request from a recycler system at a retail establishment or other business. In step 900, a financial institution associated with a recycler system may receive a deposit request from the recycler system. The request may be received by one or more systems at the financial institution including, e.g., a recycler service system and one or more server (e.g., server 231 of FIG. 2). The deposit request may correspond to a user's request to deposit funds into a specified account. In step 905, the financial institution may determine the amount of the deposit. In step 910, the financial institution may determine whether the specified account is an internal account. That is, the financial institution may determine whether the specified account is maintained or held by the financial institution. If so, in step 925, the financial institution may transfer the deposited amount of currency between accounts within the financial institution and complete the transaction. If, however, the specified account is held or backed by a different financial institution, the financial institution may initiate a request to transfer funds to the financial institution associated with the specified account in step 915.

In response to the request, the originating financial institution may determine whether authorization has been received for the requested transfer in step 920. If authorization has been received, the system transfers the funds and completes the transaction in step 925. The originating financial institution may further notify the recycler system that the transaction was completed. If, however, authorization is not received for the requested transfer, the originating financial institution may determine whether the transaction request has been denied in step 930. If the transaction request has been denied, the originating financial institution may notify the recycler system and end the transaction in step 935. If, however, authorization has not been received and the transaction request has not been denied, the originating financial institution may determine whether a time-out period has expired in step 940. That is, the originating financial institution may determine whether it has waited a sufficient amount of time for a response. If not, the originating institution may continue to wait or enter a wait mode in step 945. The time-out period may be based on the requested type of transaction or may be a standard wait time for all transactions. If the time-out period has expired, the originating financial institution may indicate that the transaction timed-out and cancel the transaction request in step 950. If a transaction request does not receive authorization, either because authorization was denied or no response was received, a user may try again at a later time.

In one or more configurations, a user may be able to designate accounts after a deposit has first been made to a temporary holding account. For example, upon depositing an amount of funds in a cash handling device, the funds may be placed into a temporary holding account. The user may then be allowed to designate where portions of the funds are to be transferred or deposited. This may safeguard from a user not allocating all of the funds prior to leaving the machine and allowing another user or an intruder to steal the remaining funds. If the user does not allocate all of the funds or does not allocate the funds within a specified amount of time, the funds may be kept in the holding account or deposited into a default account.

Aspects described herein may be applied to other types of cash handling devices such as depository machines, dispensing machines, automated teller machines, payment kiosks and the like.

In addition to depositing currency into a savings account, a debit card account, or a mobility device as discussed herein, currency deposited into a recycler system may also be used to make payments to various other accounts. For example, a user may direct the recycler system to transfer an amount deposited to pay off a credit card balance. In another example, a user may deposit money into a recycler system to pay a student loan balance or a portion thereof. Bills such as electric/utility bills, television bills, phone bills and the like may also be paid in a similar manner. In some instances, a recycler system or financial institution associated therewith may provide a financial benefit (e.g., adding 1% to a payment) if bill payments are performed through the recycler system. A financial institution may promote such payment features to motivate customers to use the recycler system. Alternatively or additionally, cash payroll disbursements may be deposited directly into an employee's account by using the recycler system.

In one or more aspects described herein, depositing cash by an employee or associate into the employee or associate's account may represent an outbound cash flow or withdrawal of funds from the business or employer. For example, if an employee is given their monthly pay in the form of cash and the employee deposits the cash into his or her account through a recycler system, the deposit may represent a withdrawal of the deposited funds from the employer's account(s).

According to one or more configurations, a cash recycler may be used in a business or organization such as a retail store, a hospital, a library and the like. The organization or business may have multiple financial accounts in which its funds are stored. The multiple account structure may be used to separate out funds by department, for example, by purpose (e.g., accounts payable, payroll, benefits), by investment and the like. In one example, an apartment complex may deposit funds (e.g., rent, security deposits, etc.) into multiple accounts, where each account corresponds to a different apartment in the complex. In another example, a hospital may need to deposit funds for bills into different accounts such as a doctor's account, the hospital's account, an anethesiologist's account and the like. Accordingly, a cash handling device such as a recycler may provide access to multiple financial accounts in a single transaction instead of requiring transactions directed to a single financial account.

Figure 10:
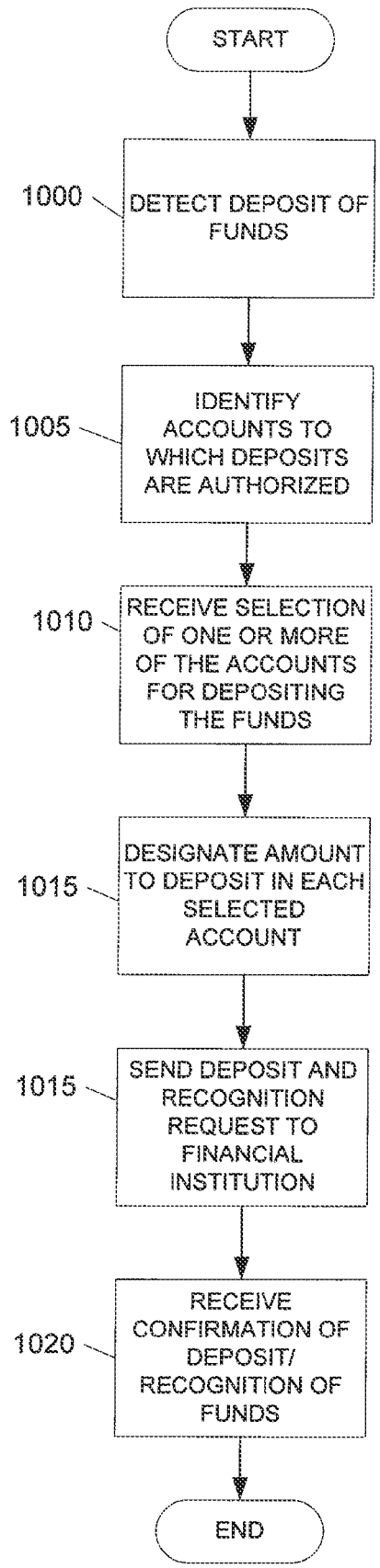
FIG. 10 illustrates an example method for processing deposit transactions across multiple accounts according to one or more aspects described herein.

FIG. 10 illustrates a method for directing funds deposited into a currency handling device such as a recycler into at least one of multiple financial accounts. In step 1000, a currency recycler may detect a deposit of funds. The detection may involve receiving a request to deposit funds (e.g., through a user interface) or sensing that money is being inserted into the device. In step 1005, the currency recycler may identify multiple accounts to which funds are authorized for deposit. The account information may be stored in a local database or may be retrieved from a financial institution or financial institutions backing the accounts. Further, accounts may be limited to certain users, roles (e.g., manager, cashier, assistant supervisor) and/or transaction types. For example, only users from a particular department may be allowed to make deposits into or withdrawals from that department's account. Thus, account information may be determined on a user-by-user basis. According to one or more aspects, accounts may be pre-authorized for use at the cash recycler prior to use. In particular, an organization or business may request authorization from a backing financial institution to make deposits and receive immediate recognition from certain devices prior to using those devices. Thus, during regular use, a user might not need to request authorization for the deposit each time a deposit is made.

In step 1010, the currency recycler may receive a selection of one or more of the multiple accounts in which to deposit funds received by the recycler. In step 1015, the currency recycler may further receive a designation of an amount to deposit in each of the selected one or more accounts. In one example, a user may divide funds deposited into the recycler into three different accounts corresponding to three different departments. Alternatively, the user may conduct three different transactions to make the three separate deposits. In step 1020, the recycler may send deposit and recognition requests for each of the accounts to a financial institution. The request may include the account to which deposits are to be placed and an amount of the deposit. Other information may also be specified such as a user making the transaction. In step 1025, the recycler may receive a confirmation that the funds were recognized (i.e., that a non-provisional credit was provided to each of the accounts in the amount specified). Withdrawals and other transactions such as change order requests may be conducted in similar fashion where an account may be identified in the transaction request. The financial institution may then complete the transaction using the account identified.

In processing such deposit and withdrawal requests, a financial institution may determine the account to which corresponding funds are to be deposited or from which the funds are to be withdrawn and determine whether the account is pre-authorized for deposit or withdrawal, respectively, from the requesting device. If so, the financial institution may conduct the transaction. For example, for a deposit, the financial institution may provide immediate recognition of the funds and return a confirmation. If not, the financial institution may issue an error or rejection notification indicating that the transaction could not be completed due to lack of authorization. Alternatively, the financial institution may request further authorization (e.g., by a manager or the like).

Figure 11:
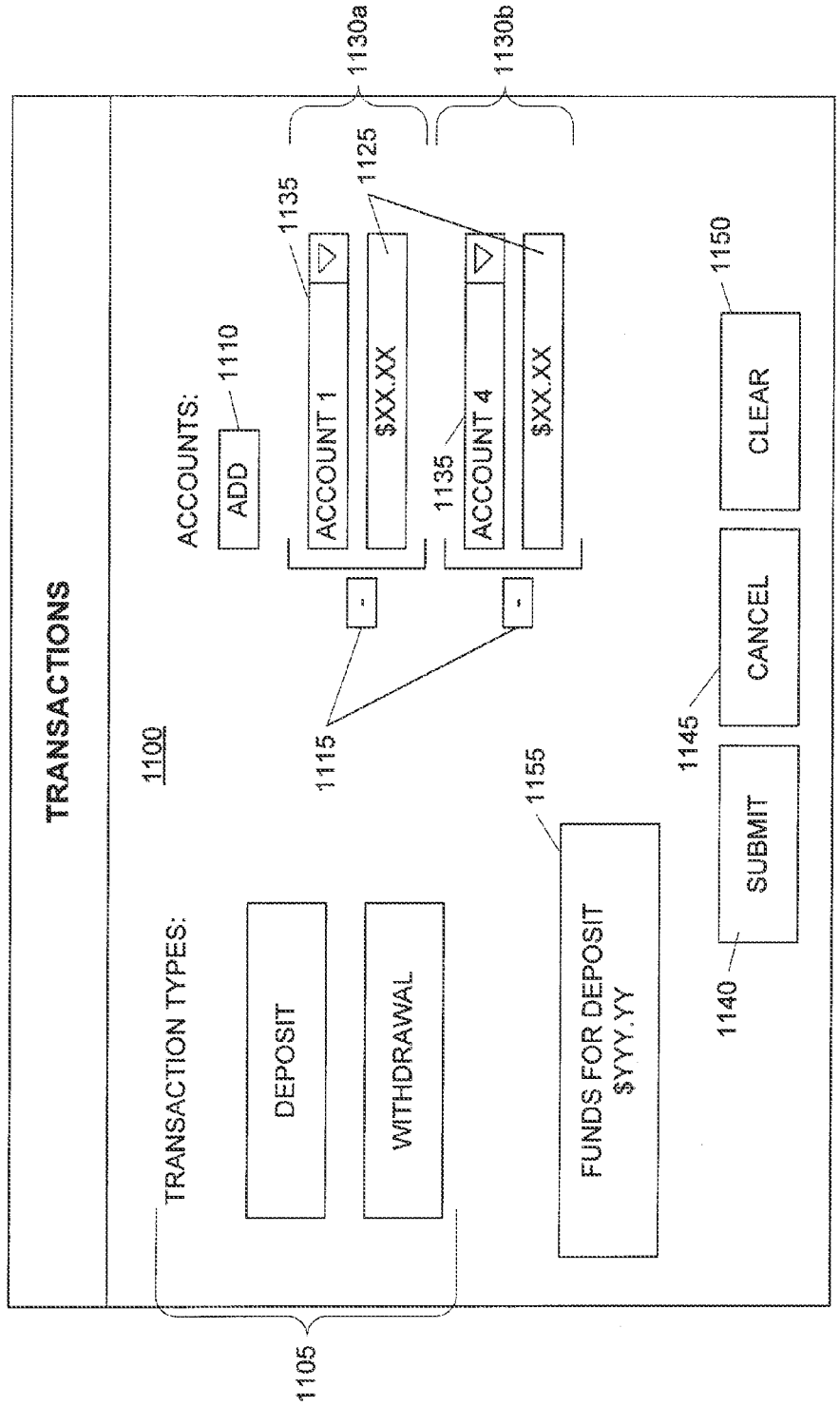
FIG. 11 illustrates an example cash handling device interface through which transactions may be conducted for multiple accounts according to one or more aspects described herein.

FIG. 11 illustrates a user interface through which a user may select one or more accounts for depositing or withdrawing funds. Interface 1100 includes a transaction type selection menu 1105 that allows a user to select the type of transaction to be conducted. The transaction types may include deposits and withdrawals, for example. Additionally, interface 1100 provides an option 1110 in which a user may add accounts to conduct transactions, remove accounts from transaction processing 1120 and specify a deposit amount for each account 1125. For example, each account entry 1130 may include a drop down menu 1135 through which a user may select the desired account and enter a corresponding amount in field 1125. Alternatively or additionally, funds may be divided based on percentage basis. Once the accounts and amounts have been specified, the user may submit 1140 the transaction to the financial institution for completion and confirmation. Alternatively, the user may cancel 1145 the transaction request or clear 1150 the entries made thus far. Additionally or alternatively, interface 1100 may include a current amount of funds 1155 for deposits. The current amount of funds 1155 may change in response to a user specifying or allocating an amount for deposit into a particular account.

Accounts may be listed as account number or using names or some other designation. For example, accounts may be listed in drop down menu 1135 based on the department (e.g., in a hospital or business) associated with the account. Alternatively, the accounts may be identified based on purpose such as savings, investments, checking and the like.

Reconciliation and auditing of the currency recycler may also take into account the accounts to which deposits are made or from which withdrawals are conducted. Thus, a recycler may determine whether the funds in the recycler reconcile with the transactions conducted across the various accounts.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method comprising:
receiving a transaction request at a currency recycler device, wherein the transaction request includes a deposit of physical currency into the currency recycler device;
determining, by the currency recycler device, a plurality of accounts for which a requested transaction is authorized through the currency recycler device, wherein each of the plurality of accounts is pre-registered in the currency recycler device and corresponds to a different balance of funds and wherein each of the plurality of pre-registered accounts is configured to receive fund deposits;
receiving, by the currency recycler device, a designation of at least two pre-registered accounts of the plurality of pre-stored accounts, wherein the designated at least two pre-registered accounts are held by a financial institution;
receiving, by the currency recycler, a designation of a first portion of an amount of the physical currency to deposit into a first pre-registered account of the at least two pre-registered accounts and a designation of a second portion of the amount of the physical currency to deposit into a second pre-registered account of the at least two pre-registered accounts;
transmitting, from the currency recycler device, the transaction request to the financial institution associated with the designated at least two pre-registered accounts, wherein the transaction request includes the designation of the at least two accounts and is transmitted after receiving the designation of the at least two pre-registered accounts;
receiving confirmation from the financial institution indicating that the transaction request has been processed; and
providing physical withdrawal availability of the physical currency from the currency recycler device after receiving the confirmation from the financial institution.

2. The method of claim 1, wherein determining the plurality of accounts for which the requested transaction is authorized is performed based on a user requesting the transaction, wherein the plurality of pre-registered accounts includes a first set of pre-registered accounts in response to determining that the user is a first user and wherein the plurality of pre-registered accounts includes a second set of pre-registered accounts different from the first set of pre-registered accounts in response to determining that the user is a second user different from the first user.

3. The method of claim 1, wherein determining the plurality of accounts for which the requested transaction is authorized is performed based on a transaction type of the requested transaction, wherein the plurality of accounts includes a first set of pre-registered accounts in response to determining that the transaction type is a first transaction type and wherein the plurality of pre-registered accounts includes a second set of pre-registered accounts different from the first set of pre-registered accounts in response to determining that the transaction type is a second transaction type different from the first transaction type.

4. The method of claim 1, wherein the confirmation from the financial institution includes an electronic acknowledgment that a non-provisional credit of the amount of the physical currency has been provided to the designated at least two pre-registered accounts.

5. The method of claim 1, wherein the currency recycler device is located at an organization and wherein determining the plurality of accounts includes identifying an account for each of a plurality of different departments within the organization.

6. The method of claim 1, wherein the currency recycler is located at a business and wherein the method further comprises:
transmitting, to a financial institution holding an account of the business, a deposit request to deposit an amount of physical currency deposited into the currency recycler device into the account of the business,
wherein the transaction request corresponds to a transfer of the amount of physical currency from the account of the business to the designated at least two pre-registered accounts.

7. The method of claim 1, further comprising registering a user to the currency recycler device including:
receiving user specified information for the user;
receiving information identifying financial accounts associated with the user;
verifying the received user specified information and financial account identification information;
in response to verifying the received user specified information and the financial account identification information:
adding the user to a database of accounts in the currency recycler device;
storing the financial account identification information with the user in the database; and
generating a security code for the user.

8. The method of claim 7, wherein verifying the financial account identification information includes verifying the ownership and existence of the identified financial accounts.

9. An apparatus comprising:
a processor; and
memory storing computer readable instructions that, when executed, cause the apparatus to:
receive a transaction request at a currency recycler, wherein the transaction request includes a deposit of physical currency into the currency recycler;
determine a plurality of accounts for which a requested transaction is authorized through the currency recycler, wherein each of the plurality of accounts is pre-registered in the currency recycler device and corresponds to a different balance of funds and wherein each of the pre-registered accounts is configured to receive fund deposits;
receive a designation of at least two pre-registered accounts of the plurality of accounts, wherein the designated at least two pre-registered accounts are held by a financial institution;
receive a designation of a first portion of an amount of the physical currency to deposit into a first pre-registered account of the at least two pre-registered accounts and a designation of a second portion of the amount of the physical currency to deposit into a second pre-registered account of the at least two pre-registered accounts;
transmit, from the currency recycler, the transaction request to the financial institution associated with the designated at least two pre-registered accounts, wherein the transaction request includes the designation of the at least two accounts and is transmitted after receiving the designation of the at least two pre-registered accounts;
receive confirmation from the financial institution indicating that the transaction request has been processed; and
provide physical withdrawal availability of the physical currency from the currency recycler device after receiving the confirmation from the financial institution.

10. The apparatus of claim 9, further comprising the currency recycler.

11. The apparatus of claim 10, wherein the currency recycler is located at an organization and wherein determining the plurality of accounts includes identifying an account for each of a plurality of different departments within the organization.

12. The apparatus of claim 9, wherein determining the plurality of accounts for which the requested transaction is authorized is performed based on a transaction type of the requested transaction, wherein the plurality of pre-registered accounts includes a first set of pre-registered accounts in response to determining that the user is a first user and wherein the plurality of pre-registered accounts includes a second set of pre-registered accounts different from the first set of pre-registered accounts in response to determining that the user is a second user different from the first user.

13. The apparatus of claim 9, wherein the transaction request includes a request for immediate recognition of an amount of funds deposited into the currency recycler and wherein the computer readable instructions further cause the currency recycler to provide immediate withdrawal availability to the deposited currency from the currency recycler.

14. The apparatus of claim 13, wherein the confirmation from the financial institution includes an electronic acknowledgment that a non-provisional credit of the amount of funds has been provided to the designated at least two pre-registered accounts.

15. One or more non-transitory computer readable media storing computer readable instructions that, when executed, cause an apparatus to:
receive a transaction request at a currency recycler, wherein the transaction request includes a deposit of physical currency into the currency recycler;
determine a plurality of accounts for which a requested transaction is authorized through the currency recycler, wherein each of the plurality of accounts is pre-registered in the currency recycler device and corresponds to a different balance of funds and wherein each of the plurality of accounts is configured to receive fund deposits;

receive a designation of at least two pre-registered accounts of the plurality of accounts, wherein the designated at least two pre-registered accounts are held by a financial institution;

receive a designation of a first portion of an amount of the physical currency to deposit into a first pre-registered account of the at least two pre-registered accounts and a designation of a second portion of the amount of the physical currency to deposit into a second pre-registered account of the at least two pre-registered accounts;

transmit, from the currency recycler, the transaction request to the financial institution associated with the designated at least two pre-registered accounts, wherein the transaction request includes the designation of the at least two accounts and is transmitted after receiving the designation of the at least two pre-registered accounts;

receiving confirmation from the financial institution indicating that the transaction request has been processed; and providing physical withdrawal availability of the physical currency from the currency recycler device after receiving the confirmation from the financial institution.

16. The one or more computer readable media of claim 15, wherein the transaction request includes a request for immediate recognition of an amount of funds deposited into the currency recycler and wherein the computer readable instructions cause the currency recycler to provide immediate withdrawal availability to the deposited currency from the currency recycler.

17. The one or more computer readable media of claim 16, wherein the confirmation from the financial institution includes an electronic acknowledgment that a non-provisional credit of the amount of funds has been provided to the designated at least two pre-registered accounts.

18. The one or more computer readable media of claim 15, wherein the currency recycler is located at an organization and wherein determining the plurality of accounts includes identifying an account corresponding to each of a plurality of different departments within the organization.

* * * * *